US006984485B2

(12) United States Patent
Matson (10) Patent No.: US 6,984,485 B2
(45) Date of Patent: Jan. 10, 2006

(54) POLYMER-COATED SUBSTRATES FOR IMMOBILIZATION OF BIOMOLECULES AND CELLS

(75) Inventor: Robert S. Matson, Orange, CA (US)

(73) Assignee: Beckman Coulter, Inc., Fullerton, CA (US)

( * ) Notice: Subject to any disclaimer, the term of this patent is extended or adjusted under 35 U.S.C. 154(b) by 489 days.

(21) Appl. No.: 10/128,350

(22) Filed: Apr. 23, 2002

(65) Prior Publication Data

US 2003/0198968 A1 Oct. 23, 2003

(51) Int. Cl.
*C12Q 1/68* (2006.01)

(52) U.S. Cl. .............................. 435/4; 435/6; 435/7.1; 422/104

(58) Field of Classification Search ................ 422/104; 435/4, 6, 7.1
See application file for complete search history.

(56) References Cited

U.S. PATENT DOCUMENTS

| | | | | |
|---|---|---|---|---|
| 4,091,166 A | | 5/1978 | Kubacki ..................... 428/411 |
| 4,613,517 A | | 9/1986 | Williams et al. ............... 427/2 |
| 4,877,745 A | | 10/1989 | Hayes et al. ................. 436/166 |
| 4,973,493 A | | 11/1990 | Guire ........................... 427/2 |
| 4,979,959 A | | 12/1990 | Guire .......................... 623/66 |
| 5,002,582 A | | 3/1991 | Guire et al. ................... 623/66 |
| 5,002,794 A | | 3/1991 | Ratner et al. ................. 427/41 |
| 5,055,316 A | * | 10/1991 | Hoffman et al. ............. 530/359 |
| 5,153,072 A | | 10/1992 | Ratner et al. ............... 428/461 |
| 5,250,613 A | | 10/1993 | Bergstrom et al. ......... 525/54.1 |
| 5,474,796 A | | 12/1995 | Brennan ..................... 427/2.13 |
| 5,514,424 A | | 5/1996 | Morra et al. ................. 427/490 |
| 5,583,211 A | | 12/1996 | Coassin et al. ............. 536/23.1 |
| 5,705,583 A | | 1/1998 | Bowers et al. ............... 526/277 |
| 5,843,789 A | * | 12/1998 | Nomura et al. ............. 436/164 |
| 5,869,135 A | * | 2/1999 | Vaeth et al. ............ 427/255.14 |
| 6,013,789 A | | 1/2000 | Rampal ...................... 536/25.3 |
| 6,020,047 A | | 2/2000 | Everhart ..................... 428/209 |
| 6,037,124 A | | 3/2000 | Matson .......................... 435/6 |
| 6,090,901 A | | 7/2000 | Bowers et al. ............... 526/277 |
| 6,131,580 A | * | 10/2000 | Ratner et al. ............... 128/898 |
| 6,139,964 A | | 10/2000 | Sathrum et al. ............ 428/408 |
| 6,146,833 A | | 11/2000 | Milton .......................... 435/6 |
| 6,150,103 A | | 11/2000 | Ness et al. ..................... 435/6 |
| 6,268,141 B1 | | 7/2001 | Matson et al. ................. 435/6 |
| 6,287,990 B1 | | 9/2001 | Cheung et al. ............. 438/780 |
| 2002/0197417 A1 | * | 12/2002 | Nakamura et al. .......... 427/585 |
| 2003/0044546 A1 | * | 3/2003 | Lahann et al. .............. 427/509 |

FOREIGN PATENT DOCUMENTS

| | | | |
|---|---|---|---|
| EP | 0 290 642 A1 | * | 11/1988 |
| EP | WO 95/15970 | | 6/1995 |
| EP | WO 97/18226 | | 5/1997 |

OTHER PUBLICATIONS

Efrosini Kokkoli and Charles F. Zuoski; *Interaction Forces Between Hydrophobic and Hydrophilic Self-Assembled Monolayrs*; Mar. 21, 2000; Journal of Colloid and Int rface Science 230, pp. 176-180.

Hongyou Fan, et al.; *Rapid Prototyping of Pattern d Functional Nanostructures*; May 4, 2000; Nature, vol. 405, pp. 56-60.

Mitchell Mason, et al.; *Attachment of Hyaluronic Acid to Polypropylene, Polystyrene and Polytetrafluoroethylene*; Dec. 28, 1998, Elsevier Science Ltd., pp. 31-36.

Kapila Wadu-Mesthrige et al.; *Imm bilization of Proteins on Self-Assembled Monolayers*; Oct. 14, 1999; Scanning vol. 22, pp. 380-388.

Joydeep Lahiri et al.; *A Strategy for the Generation of Surfaces Presenting Ligands for Studies of Binding Based on an Active Ester as a Common Reactive Intermediate: A Surface Plasmon Resonance Study*; Analytical Chemistry, vol. 71, No. 4; pp777-790.

Christopher S.. Chen, et al.; *Micropatterned Surfaces for Control of Cell Shape, Position, and Function*; Biotechnical Prog. 1998, 14, pp. 356-363.

A. S. Blawas, et al.; Review *Protein Patterning*; Biomaterials 19, (1998) pp. 595-609.

Darren M. Disley, et al.; *Convalent Coupling Of Immunoglobulin G to Self-Assembled Monolayers as a Method for Immobilizing the Interfacial-Recognition Layer of a Surface Plasmon Resonance Immunosensor*; Biosensor & Bioelectronics 13 (1998) (pp. 1213-1225).

Boris P. Belotserkovskii, et al.; *Denaturation and Association of DNA Sequences by Certain Polypropylene Surfaces*; Analytical Biochemistry 251, pp. 251-262 (1997).

Claus Duschi; et al.; *Surface Engineering: Optimization of Antigen Presentation in Self-Assembled monolayers*; Apr. 1996; Biophysical Journal, vol. 70, pp. 1985-1995.

(Continued)

*Primary Examiner*—Kenneth R. Horlick
(74) *Attorney, Agent, or Firm*—Hogan & Hartson, LLP (57) ABSTRACT

Methods for preparing a substrate for the arraying and immobilizing of biomolecules or cells are described. The methods include providing a solid support and depositing by a chemical plasma-mediated polymerization process a polymeric coating on the surface. The polymeric coating comprises at least one pendant functional group capable of attaching a biomolecule or a cell. A material of the polymeric coating is preferably selected in such a way that its surface properties enhance binding between the pendant group and the biomolecule or cell. A substrate for the immobilization of biomolecules and cells is also provided. The substrate comprises a solid support made of a polymeric material. The solid support has at least one first pendant functional group suitable for attaching a first biomolecule or a first cell on its surface. The substrate further comprises a polymeric coating deposited on the surface of the substrate. The polymeric coating increases the attachment of the first biomolecule or the first cell to the first functional group.

25 Claims, 2 Drawing Sheets

OTHER PUBLICATIONS

C. Freij-Larsson, et al.; *Adsorption Behaviour of Amphiphilic Polymers at Hydrophobic Surfaces: Effects on Protein Adsorption*; Biomaterials 1996, vol. 17, No. 22, pp. 2199-2207.

S. Stanishlawski et al.; *Plasma Protein Adsorption to Artificial Ligament Fibers*; (1995) Journal of Biomedical Materials Research, vol. 29, pp. 315-323.

Suresh K. Bhatia, et al.; *Fabrication of Surfaces Resistant to Protein Adsorption and Application to Two-Dimensional Protein Patterning*; Analytical Biochemistry 208, pp. 197-205 (1993).

Kevin L. Prime, et al.; *Self-Assembled Organic Monolayers: Model Systems for Studying Adsorption of Proteins at Surfaces*; Department of Chemistry, Harvard University, pp. 1164-1167.

Y.J. Wang, et al.; *A One-Side Hydrophilic Polypropylene Membrane Prepared By Plasma Treatment*; Journal of Membrane Science, 53 (1990) pp. 275-286.

J. R. Hollohan, et al.; *Attachment of Amino Groups to Polymer Surfaces*; Radiofrequency Plasmas; Journal of Applied Polymer Science, vol. 13, pp. 807-816 (1969).

McDonald K. Home III; *The Adsorption of Thrombin to Polypropylene Tubes: The Effect of Polyethylene Glycol and Bovine Serum Albumin*; 1985; Thrombosis Research 37; pp. 201-212.

\* cited by examiner

POLYMER-COATED SUBSTRATES FOR IMMOBILIZATION OF BIOMOLECULES AND CELLS

AREA OF THE ART

The present invention generally relates to methods of preparing substrates for the immobilization of biomolecules or cells by arraying, and specifically to substrates having a polymer coating with pendant functional groups for binding biomolecules or cells. The invention is also related to bioarrays prepared utilizing polymer-coated substrates.

DESCRIPTION OF THE PRIOR ART

Recently, a great deal of interest has been focused on the construction of bioarrays by the immobilization of polynucleotides, proteins, and cells on various solid surfaces. Polynucleotide arrays have been successfully used in gene expression analysis, DNA synthesis and sequencing, mutation detection, polymorphism screening, linkage analysis, and screening for alternative splice variants in gene transcripts (U.S. Pat. Nos. 5,474,796; 6,037,124). Protein arrays have been utilized in immunoassays, enzymatic assays, patterned cell growth, peptide libraries, optical data storage, and image detection and processing (A. S. Blaws and W. M. Reichert, Protein Patterning, *Biomaterials* 19: 595–609, 1998). Cell arrays have been found to be useful in drug discovery where high throughput and high content screening of the physiological response of cells to biologically active compounds is required (U.S. Pat. No. 6,103,479).

There are various methods, including adsorption, ultraviolet cross-linking, and covalent attachment, available for immobilizing biomolecules and cells onto solid supports. Adsorption of biomolecules on surfaces is a relatively simple method driven by ionic, hydrophobic, or Van der Waals attractive forces. However, this method does not provide sufficiently stable immobilization of biomolecules and cells on the substrates. The method also does not afford the precision of biomolecule and cell attachment, which is desired in bioarray construction.

Ultraviolet cross-linking involves derivatization of a substrate with a photochemical species which, when activated by UV irradiation, can bind target biomolecules. This method, however, is a random process, which does not permit precise array construction. Additionally, the substrates derivatized with photochemical species are sensitive to UV light which leads to difficulties in their storage and use.

A more stable and precise means of biomolecule immobilization is their covalent binding to the surface. However, due to a weak interaction between native biomolecules and unmodified substrates, a chemical modification of biomolecules and their substrates is often required in order to promote their efficient binding. For example, U.S. Pat. No. 5,215,882 discloses modifying a nucleic acid with a primary amine, followed by the reaction of the modified nucleic acid with the solid substrate having free aldehyde groups in the presence of a reducing agent. There have been other numerous reports of immobilization of biomolecules on substrates modified to carry various active groups, including hydroxyl, carboxyl, amine, hydrazine, epoxide, bromoacetyl, maleimide, and thiol (see, for example, a discussion in the Background Section of the U.S. Pat. No. 6,013,789 and A. S. Blaws and W. M. Reichert, *Biomaterials* 19: 595–609, 1998).

Other investigators have used bifunctional crosslinkers, such as silanes, for immobilizing biomolecules (U.S. Pat. No. 5,474,796). Recently, an immobilization of unmodified biopolymers to acyl fluoride activated substrates has been reported by the assignee of the present invention (U.S. Pat. No. 6,268,141). However, a chemical derivatization of a substrate surface often creates a net charge, which results in undesirable non-specific electrostatic binding of biomolecules to chemically modified substrates during subsequent procedures.

Moreover, it is extremely difficult to attach biomolecules, particularly biopolymers, to substrates, when surface properties of biopolymers and substrates do not match, even if the substrate contains a high concentration of reactive groups. For example, a hydrophilic surface would act as a repellent toward a hydrophobic biopolymer, because it is energetically unfavorable for the biopolymer in an aqueous solution to approach such a surface (U.S. Pat. No. 5,250,613).

To improve the immobilization of biopolymers, while simultaneously preventing their spontaneous adsorption on solid supports, U.S. Pat. No. 5,250,613 teaches adsorbing a water-soluble conjugate of the polyethylene imine (PEI) derivative with hydrophilic non-ionic polymer on a negatively charged solid surface and then reacting biopolymers with the surface. Alternatively, the U.S. Pat. No. 5,250,613 suggests coupling the hydrophilic nonionic polymer to the biopolymer and then reacting the resulting product with PEI to form a conjugate, which is then adsorbed on the negatively charged surface. This method, however, requires multiple complicated steps, including induction of the negative charges on surfaces and the generation of the graft polymer between non-ionic polymers and PEI.

Recently, another method utilizing a solid substrate with a PEI layer for the immobilization of amino-modified polynucleotides in an array format has been described (U.S. Pat. No. 6,150,103). This method, however, also requires multiple steps. Therefore, the arrays produced by such a technique are fairly expensive and not always consistent in quality. Furthermore, this method requires an addition of a thickening agent to biopolymers in order to ensure that each drop of the biopolymer will stay in the desired location of the array. The addition of such a thickening agent may negatively affect the biomolecule-binding capability of the array.

Many investigators have also been using commercially available polymer-coated glass slides to construct microarrays. However, commercially available substrates, such as glass slides coated with poly-L-lysine, utilize inferior attachment chemistries, while others, prepared by dip-coating or spraying of slides with acrylamide or glutaraldehyde, may provide non-uniform coated surfaces with a limited shelf life. Also, commercial substrates designed for the attachment of one type of biomolecules, e.g. nucleic acids, may not be suitable for the attachment of other biomolecules, e.g. proteins.

Therefore, existing methods and substrates do not provide convenient, inexpensive, and reliable procedures for the fabrication of biomolecule or cell arrays. Accordingly, it is desirable to develop more cost-effective, rapid, reliable, and flexible methods for bioarray construction.

SUMMARY OF THE INVENTION

Therefore, it is an object of the present invention to provide a method that allows the tailoring of physical and chemical properties of a substrate to the properties of a biomolecule being attached to the substrate. It is a further object of the present invention to provide immobilization substrates with reasonable shelf lives, which are stable at ambient conditions, inexpensive, and physically rugged. It is another object of the present invention to provide substrates having surfaces suitable for immobilizing biomolecules and cells at site-specific locations and at high densities.

These and other objects are achieved in the present invention by utilizing a flexible coating process that introduces new chemistries and selected surface properties (e.g., hydrophobic, hydrophilic, zwitterionic) onto inert or activated solid substrates.

Accordingly, one aspect of the present invention provides a method of preparing a substrate for immobilizing biomolecules or cells. The method includes the steps of:

(a) providing a solid support having a surface; and (b) depositing by a chemical plasma-mediated polymerization process a polymeric coating on the surface, wherein the polymeric coating comprises at least one pendant functional group capable of attaching a biomolecule or a cell. In one embodiment, the chemical plasma-mediated polymerization process is a chemical vapor deposition (CVD). In another embodiment, the chemical plasma-mediated polymerization process is a plasma-induced grafting.

The polymeric coating of the present invention may comprise a carboxylated polymer. The carboxylated polymeric coating may be activated by converting carboxyl groups into groups capable of attaching the biomolecule or the cell. In one embodiment, the carboxylated polymer is activated by converting carboxyl groups into acyl fluoride groups.

A material of the polymeric coating is preferably selected in such a way that its surface properties enhance binding between the pendant group and the biomolecule or cell. In one embodiment, the material of the polymeric coating is selected to maximize non-covalent attractive forces, including ionic, hydrophobic, or Van der Waals forces, between the polymeric coating and biomolecules or cells being attached. For example, when the biomolecule or an outer surface of the cell is hydrophobic, the polymeric coating is preferably hydrophobic.

Another aspect of the present invention is directed to a substrate for the immobilization of biomolecules and cells prepared by the above-described method. In another aspect, the present invention provides a substrate for immobilizing a biopolymer or cell. The substrate comprises a solid support made of a polymeric material.

The solid support has at least one first pendant functional group suitable for attaching a first biomolecule or a first cell on its surface. The substrate further comprises a polymeric coating deposited on the surface of the substrate. The polymeric coating increases the attachment of the first biomolecule or the first cell to the first functional group.

In another aspect, the present invention provides a method of attaching biomolecules and cells to a solid support. The method includes the steps of:

(a) providing a biomolecule or a cell;

(b) providing a solid support;

(c) depositing by a chemical plasma-mediated polymerization process a polymeric coating on a surface of the support to form a coated substrate, wherein the polymeric coating comprises at least one pendant functional group capable of attaching the biomolecule or the cell; and (d) contacting the biomolecule or the cell with the coated substrate under a condition that allows the binding of the biomolecule or the cell with the pendant functional group.

A further aspect of the present invention provides bioarrays prepared by a method comprising the steps of:

(a) providing a plurality of biomolecules or cells;

(b) providing a solid support with a surface;

(c) depositing by a chemical plasma-mediated polymerization process a polymeric coating on the surface of the support to form a coated substrate, wherein the polymeric coating comprises at least one pendant functional group capable of attaching the biomolecule or the cell; and (d) contacting the biomolecules or the cells with pendant functional groups at discrete locations on the coated substrate under a condition that allows the binding of the biomolecules or the cells with the pendant functional groups to form a bioarray.

The present invention provides many economic and technical advantages. Those skilled in the art will appreciate that the coating processes of the present invention allow the rapid and uniform introduction of functional groups onto otherwise inert materials. Additionally, the surface properties of the polymeric coatings of the present invention may be easily matched with those of the biomolecules being attached to enhance biomolecule-substrate or cell-substrate binding. Therefore, the present invention provides versatile and cost-effective processes of bioarray construction that overcome the disadvantages of the multi-step methods of prior art.

The above-mentioned and other features of this invention and the manner of obtaining them will become more apparent, and will be best understood, by reference to the following description, taken in conjunction with the accompanying drawings. These drawings depict only a typical embodiment of the invention and do not therefore limit its scope.

DETAILED DESCRIPTION OF THE INVENTION

One aspect of the present invention provides a method of preparing a substrate for immobilizing biomolecules or cells. The method includes the steps of:

(a) providing a solid support having a surface; and (b) depositing by a chemical plasma-mediated polymerization process a polymeric coating on the surface, wherein the polymeric coating comprises at least one pendant functional group capable of attaching the biomolecule or the cell.

The term "biomolecule," as used herein, refers to nucleic acids, polynucleotides, polypeptides, proteins, carbohydrates, lipids, drug, hapten or other small organic molecules, such as dyes, and analogues thereof. As used herein, "polynucleotide" refers to a polymer of deoxyribonucleotides or ribonucleotides, in the form of a separate fragment or as a component of a larger construction. "Polynucleotide," as used herein, may be DNA, RNA, a DNA analog, such as PNA (peptide nucleic acid), or a synthesized oligonucleotide. The DNA may be a single- or double-strand DNA, or a DNA amplified by PCR technique. The RNA may be an mRNA. The DNA or RNA may contain dideoxynucleotides.

The length of the polynucleotides may be 3 bp to 10 kb. In accordance with one embodiment of the present invention, the length of a polynucleotide is in the range of about 50 bp to 10 kb, preferably, 100 bp to 1.5 kb. In accordance with another embodiment of the present invention, the length of a synthesized oligonucleotide is in the range of about 3 to 100 nucleotides. In accordance with a further embodiment of the present invention, the length of the oligonucleotide is in the range of about 40 to 80 nucleotides. In accordance with still another embodiment of the present invention, the length of the oligonucleotide is in the range of about 15 to 20 nucleotides.

As used herein, the term "polypeptide" refers to a polymer of amino acids, wherein the α-carboxyl group of one amino acid is joined to the α-amino group of another amino acid by a peptide bond. A protein may comprise one or multiple polypeptides linked together by disulfied bonds. Examples of the protein include, but are not limited to, antibodies, antigens, ligands, receptors, etc.

As used herein, the term "cell" refers to any live or dead single cell, multi-cell, tissue or cellular fragments, cell membrane, liposomal preparation or sub-organelle such as the mitochondria, ribosome or nucleus. Both adherent and non-adherent cell types may be immobilized. Cells include, but are not limited to, human capillary endothelial cells, HeLa, A549, and breast cancer cell lines, such as BT-474. Certain cell lines will require co-adhesion of fibronectin or other cell-stabilizing extracellular matrix proteins. Certain peptides, such as the tetrapeptide, RGDS, may be attached to enhance the binding of proteins and cells.

For the purpose of the present invention, the solid support of the present invention may be any material providing a surface for polymeric coating deposition. Examples of a solid support include, but are not limited to, polymeric and ceramic materials, glasses, ceramics, natural fibers, silicons, metals, and composites thereof In accordance with one embodiment of the present invention, a solid support of the present invention may be fabricated of a polymeric material, such as polypropylene, polystyrene, polycarbonate, polyethylene, polysulfone, PVDF, Teflon, their composites, blends, or derivatives.

As used herein, the term "chemical plasma-mediated polymerization process" refers to any process involving the use of a chemical plasma to assist, initiate or catalyze the formation of polymeric materials. Examples of the chemical plasma-mediated polymerization process include, but are not limited to, chemical vapor deposition (CVD) and plasma-induced grafting, or their combination.

The CVD of thin organic films has been successfully used in a number of areas of technology, from decorative coatings on ceramic or pottery materials, to circuit interconnection wiring paths on the surfaces of semi-conductor chips, to wear-resistant coatings on cutting tool and bearing surfaces. For example, U.S. Pat. No. 4,091,166 teaches a deposition of a boron trifluoride containing optical or thermoplastic substrates to achieve increased scratch or abrasion resistance. U.S. Pat. No. 5,514,424 describes depositing a thin layer of fluorinated polymer obtained by plasma-induced polymerization on a solid body to reduce the friction coefficient between water and the body, and for increasing the water repellency of said surfaces. U.S. Pat. No. 6,287,990 discloses depositing a low dielectric constant film on a substrate to form a semiconductor device.

Films deposited by CVD show many desirable characteristics, including ease of preparation, uniformity, conformal coverage of complex substrates, excellent adhesion to a variety of substrates, and the ability to generate unique chemistries. In addition, the overlayer films do not penetrate significantly into the substrate and, therefore, do not affect the mechanical properties of the substrate (U.S. Pat. Nos. 5,002,794 and 5,153,072). Prior to the present invention, however, the CVD method has not been used in preparation of bioarrays. This is possibly because the prior art has treated plasma-deposited films as having an ill-defined chemistry (U.S. Pat. Nos. 5,002,794 and 5,153,072).

Plasma-induced grafting has been used for example to graft poly(acrylic acid) on PTFE to increase protein binding; or the grafting of polyethylene oxide (PEO) to plastics to reduce protein adsorption and cell attachment.

It is an unexpected discovery of the present invention that the chemical plasma-mediated polymerization method may be used to introduce desired pendant functional groups onto substrates to facilitate the binding of biomolecules and cells to the substrates. Additionally, it is a discovery of the present invention that the chemical plasma-mediated polymerization method may be used to selectively modify a surface of the solid support in order to match its surface properties with those of a biomolecule or a cell being attached, thus improving surface interactions therebetween. Additionally, when substrates of the present invention are used as bioarrays, surface modification may beneficially enhance subsequent binding between the attached capture probe and the analyte.

The deposition of polymeric materials onto solid supports by chemical plasma-mediated polymerization is a well-known process and will not be discussed here in detail. For example, when CVD is used, the solid support to be coated is placed within a plasma chamber, which is typically evacuated or pressurized to a desired pressure. The coating material to be deposited on the support is generated within or introduced into the chamber, and assumes the form of a plasma that includes gaseous vapors and solid particulate matter. The plasma may include atoms, molecules, ions, and agglomerates of molecules of the coating material, as well as those of any desired reactant agents and any undesired impurities. The coating or deposition process itself occurs by condensation of the plasma-coating particles onto the support surface(s) to be coated. The deposition chamber may be evacuated prior to a deposition "run" to purge the chamber of impurities, but in general, chemical vapor deposition is performed at atmospheric or at positive (above atmospheric) pressure levels (U.S. Pat. No. 6,139,964).

In plasma-induced grafting, the substrate is first pre-treated in a noble gas-plasma, such as argon- or helium-plasma. Then, a monomer or a polymer is introduced into the plasma-chamber and is allowed to react with the substrate. In the chemical vapor deposition (CVD) process, polymerization is initiated within the vapor phase. For example, a silicon coating can be formed on a surface from a silane CVD process. The coatings are the result of the decomposition of high vapor pressure gaseous compounds. These are transported to a substrate surface where the coating is formed usually by a thermal decomposition reaction near or at the substrate surface.

A "plasma" is most preferably an ionized gas, which gains sufficient ionization energy from an electromagnetic field and exhibits long range electromagnetic forces. Plasma energy sources include, but are not limited to, direct current, alternating current, radio frequency microwaves, shock waves, and lasers. Low temperature plasma treatments include radio frequency plasma discharge ("RFPD"), microwave frequency plasma discharge ("MFPD"), and corona discharge ("CD"); such treatments all typically affect only the surface of a solid material, leaving the remainder of the material unmodified. In the preferred embodiment, RFPD is utilized.

Plasma-generating devices are commercially available. For example, a particularly preferred plasma generator is available from Plasma Science, Foster City, Calif. (Model No. PS0150E radio-frequency). Such devices are preferred because the conditions for the introduction of gases, power, time of plasma discharge, etc. can be readily selected, varied, optimized, and controlled. These parameters can be optimized with little experimentation, principally because the physical condition of the polymeric coating is adversely affected if, for example, the amount of power (typically in watts) is too high, or the length of time of plasma discharge is too great. Such adverse affects are typically manifested by the creation of a "brittle" polymer medium. Accordingly, those skilled in the art are credited with the ability to optimize the conditions for efficient chemical plasma-mediated deposition of polymeric coatings.

A wide range of power settings, radio frequencies, and duration of exposure of the polymeric surface to the plasma may be used. Ranges for these three parameters, which provide advantageous results, are DC or AC power levels between about 10 and about 500 watts, more preferably between about 100 and about 400 watts. The duration of exposure is from about 0.1 to about 30 minutes, and most preferably is about 2–10 minutes. It is also preferred that radio frequency waves be utilized; preferably, these are within the range of from about 1 MHz to about 50 MHz, and most preferably 10–20 MHz.

The polymeric coating of the present invention can be formed by CVD of a preformed polymer having the desired functional groups and surface properties. Alternatively, a simultaneous chemical plasma-mediated polymerization and the deposition of monomers carrying the desired functional groups may form the polymeric coating of the present invention.

The polymeric coating of the present invention may comprise any polymer having pendant functional groups capable of covalent binding of a biomolecule or cell. Examples of such pendant functional groups include, but are not limited to, acyl fluorides, anhydrides, oxiranes, aldehydes, hydrazides, acyl azides, aryl azides, diazo compounds, benzophenones, carbodiimides, imidoesters, isothiocyanates, NHS esters, CNBr, maleimides, tosylates, tresyl chloride, maleic anhydrides, and carbonyldiimidazoles. Those skilled in the art will appreciate that these functional groups will react with nucleophilic groups of biomolecules and outer cell surfaces to covalently bind biomolecules or cells.

Examples of nucleophilic groups present on biomolecules that are likely to react with pendant functional groups of the supports of the present invention include, but are not limited to, amine groups, hydroxyl groups, sulfhydryl groups, and phosphate groups.

Similarly, nucleophilic groups present on outer surfaces of cells that are likely to react with pendant functional groups of the supports of the present invention include, but are not limited to, the glycosyl hydroxyl moieties of glycoprotein surface antigens, protein side-chain amine groups, such as lysine, arginine and histidine or sulfhydryl (cysteine, methionine), or hydroxyl (tyrosine, tryptophan) residues, and the aspartic acid, glutamic acid carboxyl side-chains of surface proteins. Likewise, certain phospho- and glycolipids contain hydroxyl and amine functional head groups capable of covalent attachment. Nucleophilic reactivity follows the general order R—S$^-$>R—NH$_2$>R—COO$^-$≅R—O$^-$, where R refers to the appropriate side-chain group on the biomolecule.

Alternatively, the polymeric coating may comprise a polymer capable of being derivatized to form functional groups suitable for the covalent attachment of biomolecules and cells. For example, in one embodiment, the polymeric coating comprises a carboxylated polymer and the depositing step (b) of the above-described method comprising:

(c) depositing by the chemical plasma-mediated polymerization the carboxylated polymer coating on the surface, wherein the carboxylated polymeric coating contains at least one pendant carboxyl group; and (d) activating the carboxylated polymeric coating by converting the carboxyl group into a group capable of attaching a biomolecule or a cell.

Typically, the depositing step (c) comprises the steps of:

(e) introducing a carboxylated monomer and the solid support into a plasma chamber; and (f) forming the carboxylated polymeric coating on the solid support by providing an RFPD in the plasma chamber under conditions sufficient for free radical polymerization of the carboxylated monomer to form a carboxylated polymer and for further adsorption of the formed carboxylated polymer on the solid support.

Any polymerizable monomer having desired pendant functional groups may be used to form polymeric coatings of the present invention. Methods of controlling the chemical structure of polymeric films produced by plasma deposition are known to those skilled in the art (see, for example, U.S. Pat. No. 5,153,072) and, thus, will not be discussed here in a detail. For example in one embodiment, reactive groups are added using silane chemistry. For example epoxy groups may be introduced using 3-glycidoxy propyl trimethyl silane (TMS), thiol groups using 3-mercapto propyl TMS, and amino groups using 3-amino propyl TMS.

When carboxylated polymeric coatings are desired, the polymerizable monomer should preferably contain carboxyl groups. Examples of a suitable carboxylated monomer include, but are not limited to, acrylic acid monomer, vinyl acetic acid monomer, carboxy-silane monomer, carboxy-silanol monomer, methacylate monomer, and acylate monomer, and mixtures thereof.

Figure 1:
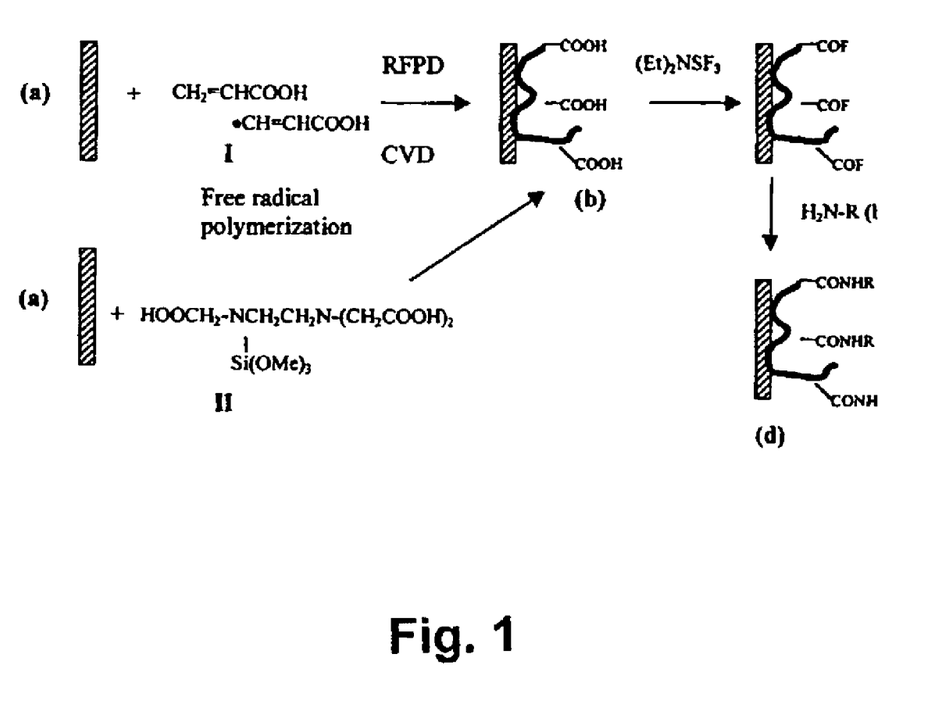
FIG. 1 is a diagram illustrating the formation of an array surface of the present invention and its use in biomolecule binding.
Figure 2:
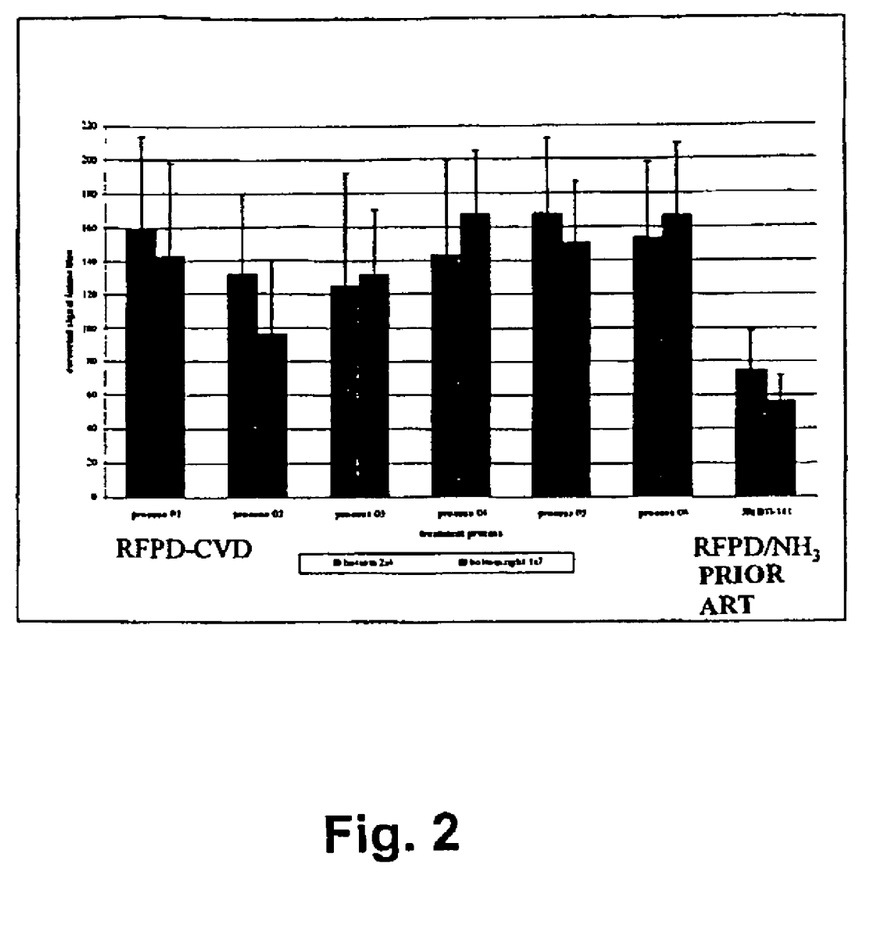
FIG. 2 is a bar graph comparing the surface binding capacity of the substrates coated with carboxylated polymers prepared by the radio frequency plasma discharge-chemical vapor deposition (RFPD-CVD) method of the present invention with that of surface-activated substrates of prior art prepared by RFPD in an ammonia gas atmosphere.

In one embodiment, as shown in FIG. 1, an acrylic acid monomer (I) is introduced into a plasma chamber along with an inert substrate [step (a)]. An RFPD is produced across electrodes, resulting in free radical polymerization in which the carboxylated polymer becomes adsorbed by CVD onto the surface of the substrate [step (b)]. Subsequently, the carboxyl groups are converted to acyl fluorides [step (c)]. In another embodiment, as shown in FIG. 1, a silane compound (II) is polymerized and deposited by CVD onto the solid support.

The present invention is not limited to a particular activation chemistry of carboxyl groups. Thus, while acyl fluoride activation is used in one embodiment of the present invention, there are many other chemistries, such as NHS esters and carbonyldiimidazoles, which may also be employed.

When acyl fluoride activation is used, the activating step comprises converting the carboxyl group into an acyl fluoride group. In accordance with the present invention, suitable reagents for forming acyl fluoride functionalities on the solid support broadly include carboxyl reactive fluoridating reagents. A most preferred reagent is (diethylaminosulphur) trifluoride (DAST). Other suitable reagents include cyanuric fluoride or tetramethylfluoroformadinium hexafluorophosphate. The conditions under which carboxyl groups of a polymer may be converted into acyl fluoride groups have been previously described (U.S. Pat. No. 6,268,141). Similar conditions may be used to activate carboxyl groups of the polymeric coating of the present invention and, thus, such conditions will not be discussed herein.

Pretreating the surface of the solid support may enhance the condensation, polymerization, and adsorption of the polymeric coating. In one embodiment, plasma etching is used as a method of the surface pretreatment. Other methods of the surface pretreatment are known in the art and include, for example, chemical oxidation using strong acids, such as sulfuric acid, or using chromium (VI) oxide in an acetic acid-anhydride mixture.

In a preferred embodiment of the present invention, the method of preparing a substrate further includes a step of selecting a material for the polymeric coating. The material is selected by its ability to form a polymeric coating with desired pendant functional groups for the covalent binding of biomolecules or cells. In the most preferred embodiment, the material is also selected so that the deposited polymeric coating has surface characteristics that maximize non-covalent interactions between the coating and the biomolecules or cells. These non-covalent interactions, including ionic, hydrophobic, and Van der Waals attraction, supplement covalent binding of the biomolecule or cell to the functional group on the substrate.

In one embodiment, surface properties of the polymeric coating are matched to those of biomolecules or cells being attached in order to maximize attractive forces therebetween. For example, when the biomolecule or an outer surface of the cell is hydrophobic, the polymeric coating is preferably hydrophobic. A polymeric coating is hydrophobic when it excludes water from its structure or does not allow appreciable wetting of the underlying surface, thereby preventing adsorption of hydrophilic biomolecules. Contact angles ($\angle$, water) on hydrophobic polymeric surfaces are generally greater than or equal to 100° while $\angle 45°$ are observed on hydrophilic surfaces. Examples of polymeric materials that may be used to form hydrophobic coatings include, but are not limited to, alkyl thiols, alkyl silanes, and mixtures thereof. For example, methyl methacylate and hemamethyldisiloxane monomers introduced to substrates during plasma polymerization may be used to form hydrophobic polymers containing carboxylate groups. Variation in relative surface hydrophobicity can be achieved with various plasma surface treatments. For example, following the oxygen plasma oxidation of PDMS, various alkyltrichlorosilanes are able to form self-assembled monolayers (SAMs) that vary in their contact angles.

When the biomolecule or an outer surface of the cell is hydrophilic, the polymeric coating is preferably hydrophilic. A polymeric coating is hydrophilic when it permits surface wetting by water and hydrophilic biomolecules. Examples of polymeric materials that may be used to form hydrophilic coatings include, but are not limited to, polyethylene glycols, polycarboxylic acids, and polylysine.

Finally, when the biomolecule or an outer surface of the cell has both cationic and anionic functionalities, the polymeric coating is preferably zwitterionic. A polymeric coating is zwitterionic when it carries both anionic and cationic charges. Examples of polymeric materials that may be used to form zwitterionic coatings include, but are not limited to, zwitterionic silanes, zwitterionic detergents, or other surfactants. Those skilled in the art will appreciate that one of the main advantages of the present invention is that it utilizes a controlled polymerization and coating process that allows the production of substrates with surface properties tailored to the attachment of the biomolecules and cells of interest.

In another embodiment of the present invention, the polymeric coating comprises a mixture of polymeric materials that, when deposited, form local areas with different surface properties. For example, one portion of the coating may be hydrophobic, while another hydrophilic or zwitterionic. Such mixed coatings may be particularly useful when it is desired to attach different types of biomolecules or cells to the same support. Similarly, a mixture of polymeric materials may be used to produce a coating with at least two types of pendant functional groups reactive toward different types of biomolecules or cells. Therefore, this embodiment may be particular useful in the construction of bioarrays comprising different types of biomolecules or cells.

For example, in one embodiment, the polymeric coating deposited on the solid support is a monolayer of a single silane or a silanol compound or a mixture of silane or silanol compounds. When a mixture of silane or silanol compounds are used, each compound may have different functional groups and/or surface properties. Mixtures of silanes or silanols, e.g. hydrophobic silane with reactive silane (silane with pendant functional groups) or hydrophilic silane with reactive silane, may be used in order to optimize surface interaction with the biomolecules or cells being attached .

For example, self-assembled monolayers (SAM) of n-octadecyltrimethoxysilane may be formed on $SiO_2$ surfaces. Then, bovine serum albumin (BSA) forms monolayers on this SAM surface. The BSA may be used as a scaffold to immobilize other biomolecules, such as antibodies. It is possible to print down SAMs in discreet locations on the substrate surface, thereby creating surface patterns of the SAM coating and $SiO_2$. The $SiO_2$ surface can be coated with different SAMs or subjected to plasma polymerization in order to form new surfaces with polymers containing other functional groups. Thus, antibodies recognizing cell surface antigens could be used to immobilize specific cell types, while other surrounding areas could be used to immobilize cell growth factors or stabilizing agents, e.g. fibronectin.

Another aspect of the invention is directed to the modification of the surface of the solid support by plasma reaction to the allow site-specific attachment of additional surface groups to create surface-coating patterns. Thus, a plastic substrate may be physically masked, for example, by overlaying the substrate with a mesh having a discrete pattern of holes to form exposed and covered areas. The exposed areas are subsequently plasma-oxidized, etched or otherwise treated to produce surface functional groups, such as amines or hydroxyl groups, using a reactive plasma. For example, a plastic substrate may be oxidized and etched in a $CF_4$—$O_2$ plasma or amine groups introduced onto the exposed surface in an ammonia-plasma deposition process. In this manner, the exposed areas become surface-treated and the covered areas remain as the native substrate. The mask can then be removed and the patterned substrate may be further coated during plasma polymerization.

Alternatively, the plasma-treated exposed areas may be independently and site-specifically coated with other surface groups. This can be accomplished by printing chemicals onto the treated areas and or the untreated areas to create different adjacent surface chemistries. For example, the oxidized area may contain carboxyl groups rendering the exposed area hydrophilic, while the untreated areas remain hydrophobic. Biomolecules,such as proteins, may then be covalently attached to the exposed areas by reacting the protein's lysyl residues with the substrate carboxyl groups in the presence of a condensing agent, such as EDAC/NHS, which catalyzes the formation of reactive carboxyl esters. These, in turn, condense with the protein's side-chain amine groups. Allyl alcohol plasma creates surface hydroxyl groups which can then be used to graft polyethylene oxide onto the exposed surface. Such a surface exhibits substantially reduced protein adsorption.

The present invention also provides a substrate for immobilizing a biopolymer or cell, which is prepared by the above-described method. Because the substrate of the present invention is particularly useful in the preparation of biomolecule and cell arrays for the evaluation or identification of biological activity, in one embodiment, the solid support is in the form of a device having at least one flat planar surface. The size of the solid support can vary and depends upon the final use of the immobilized biomolecules and cells. Those skilled in the art will appreciate that, for example, arrays of biopolymers immobilized on miniaturized solid supports have been under development for many years. These solid supports have a size area on the order of $mm^2$ and can have numerous different immobilized biopolymers, each with different biopolymers attached to a different site-specific location on the miniaturized solid support.

Solid supports in the form of dip sticks are also within the scope of the present invention. As known in the art, dip sticks typically are rectangular in shape with each side measuring a few centimeters. On the other hand, large biopolymers, such as polynucleotide arrays, utilized for sequencing whole genomes, may have dimensions measuring a meter or more. In order to accommodate a number of different testing techniques including specialized testing equipment, suitable solid supports can also be molded into any of a variety of shapes.

In accordance with one embodiment of the present invention, a solid support of the present invention may be made of a porous or non-porous material. In accordance with another embodiment of the present invention, a solid support of the present invention may be in a form of threads, sheets, films, gels, membranes, beads, plates and like structures. In accordance with a further embodiment of the present invention, a solid support may be fabricated from plastic in the form of a planar device having discrete isolated areas in the form of wells, troughs, pedestals, hydrophobic or hydrophilic patches, diecut adhesive reservoirs or laminated gasket diecuts that form wells, or other physical barriers to fluid flow. Examples of such a solid support include, but are not limited to, a microplate or the like.

In one embodiment, the solid support is made of an inert material incapable of covalent binding of the biomolecules or cells. Examples of such inert materials include unmodified polymeric materials, ceramic materials, metals, natural fibers, silicons, glasses, and composites thereof.

In another embodiment, the solid support comprises a material, for example, a polymer, having at least one first pendant functional group suitable for attaching a first biomolecule or a first cell. In this embodiment, the polymeric coating may comprise at least one second pendant functional group suitable for covalent binding a second biomolecule or a second cell. The first and the second pendant functional groups may be the same or different. The first and the second functional groups are any groups that covalently bind the biomolecules or the cells. For example, the first and the second functional groups may be selected independently from the group consisting of: acyl fluorides, anhydrides, oxiranes, aldehydes, hydrazides, acyl azides, aryl azides, diazo compounds, benzophenones, carbodiimides, imidoesters, isothiocyanates, NHS esters, CNBr, maleimides, tosylates, tresyl chloride, maleic anhydrides, and carbonyldiimidazoles.

In a preferred embodiment, an underlying support having attached first functional groups is coated with a polymeric material that improves the support's ability to bind biomolecules or cells. For example, the material of polymeric coating may be selected to provide a more hydrophilic (or hydrophobic, or zwitterionic, charged or affinity-based molecular recognition) local environment surrounding the first functional groups. Charged groups provide a formal charge, such as from sulfonic acid groups. Affinity groups would include ligand-binding domains of antibodies, protein A, etc. By altering the local environment surrounding the first functional groups, an enhanced adsorption of the biomolecules or the cells onto the support may be achieved. Subsequently, the biomolecules or cells adsorbed on the substrate will bind to the first functional groups more efficiently.

In another embodiment, the chemical plasma-mediated polymerization process of the present invention is used to increase the number of reactive sites over that of the underlying support. For example, given a support having a certain number of first pendant functional groups, one can create a polymeric coating having second pendant functional groups that also contribute to the binding of the biomolecules and cells. Therefore, a substrate with more densely positioned biomolecule- or cell-binding groups can be formed.

The substrate of the present invention is well suited for the attachment of biomolecules and cells. Accordingly, in a further aspect, the present invention provides a method of attaching biomolecules and cells to a solid support. The method comprises the steps of:

(a) providing a biomolecule or a cell;
(b) providing a solid support with a surface;
(c) depositing by chemical plasma-mediated polymerization process a polymeric coating on the surface to form a coated substrate, wherein the polymeric coating comprises at least one pendant functional group capable of attaching the biomolecule or the cell; and
(d) contacting the biomolecule or the cell with the coated substrate under a condition that allows the binding of the biomolecule or the cell with the pendant functional group.

The biomolecules or cells are attached to the coated substrate of the present invention by contacting them under a condition sufficient for allowing the attachment of the biomolecules or cells to the solid support. A condition is sufficient if it allows the biomolecules or the outer surface of the cells to react with pendant functional groups of the polymeric coating for covalently attaching the biomolecules or cells to the substrate. For example, when pendant functional groups are acyl fluorides, biomolecules, such as polynucleotides, may be attached to a solid support by displacement of the fluoride group contained in the polymeric coating with a nucleophile of the biomolecule, as described in U.S. Pat. No. 6,268,141.

For example, 5'-amino modified oligonucleotides react with surface polymers that are activated with terminal groups, such as acyl fluorides, aldehydes, or epoxides. The carbohydrate moiety of glycoproteins may be periodate oxidized to aldehydes, which in turn react with polymeric supports containing surface hydrazide groups. Similarly, cells, such as yeast, bacteria or other microorganisms, may be attached to the solid support by glutaraldehyde treatment.

HeLa or 3T3 cells are best attached indirectly by association with fibronectin-covered surfaces. Fibronectin is covalently attached by glutaraldehyde cross-linking. Lipids can be covalently attached to surfaces by reaction of the headgroups. For example, phosphatidyl ethanolamine, having an amine (R—$PO_3$O—$CH_2CH_2NH_3^+$) headgroup, can be coupled via hetero-bifunctional cross-linking agents, such as SPDP, to thiol-activated surfaces. Conversely, phospholipid tailgroups may be attached by adsorption to surfaces covered by self-assembled monolayers of alkyl chain containing polymers.

In accordance with one embodiment of the present invention, in which pendant functional groups are acyl fluorides and biomolecules are polynucleotides, the step of contacting the polynucleotides with the coated substrate is accomplished in the presence of an aqueous buffer, preferably with a neutral or basic pH. Bringing the acyl fluoride functionalities into contact with the polynucleotides under neutral or basic pH conditions results in the attachment of the polynucleotides directly to the surface of the polymeric coating. For the purpose of the present invention, a basic pH condition is a condition that has a pH greater than 8. A basic pH condition is sufficient if it allows the attachment of the polynucleotides to the solid support. In accordance with one embodiment of the present invention, the basic pH condition of the present invention has a pH of about 9 to 12. It should be understood that the basic pH condition may vary, depending on the method used. One skilled in the art can readily ascertain the basic pH condition of a particular attachment reaction in view of the disclosure of the present invention.

A coated substrate of the present invention may be contacted with biomolecules and cells by methods that are known in the art. For example, the contacting step may be carried out by solenoid or piezo-driven non-contact jet printing. Alternatively, solid or open capillary device contact printing, microfluidic channel printing, silk screening, and a technique using printing devices based upon electrochemical or electromagnetic forces may be employed.

The coated substrate may also be exposed to biomolecules by manual spotting. Examples of manual spotting include, but are not limited to, manual spotting with a pipettor or with a Biomek pin tool. In this case, the preferred aqueous base may be sodium bicarbonate-carbonate with a pH in the range of 9 to 10. In another embodiment, the solid support is exposed to unmodified polynucleotides by jet printing techniques. Thermal inkjet printing techniques utilizing commercially available jet printers and piezoelectric microjet printing techniques, as described in U.S. Pat. No. 4,877,745, can be utilized to spot unmodified polynucleotides to solid supports. In this case, the aqueous base may be a LiCl salt solution with a pH of about 10 to 12.

It should be understood that the coated substrates of the present invention may be exposed to biomolecules or cells by any method as long as the biomolecules or cells are put in contact with the solid support. It should also be understood that other aqueous buffer systems, which are not explicitly described here, may also be used in the present invention as long as the buffer system provides a sufficient condition that allows the attachment of biomolecules or cells to the coated substrate once they are in contact with each other.

In accordance with embodiments of the present invention, the concentration of biomolecules and cells contained in aqueous solutions may vary, depending on the type of molecule or cell, its size, structure, and other factors that may influence solubility and attachment of the molecules and cells. Accordingly, it is important to determine optimal surface density of functional groups. When the surface density is too low, the attachment may be inefficient. When the surface density is too high, the attachment may be prevented by steric hindrance effects. For example, when the attached polymers are polynucleotides, preferably they are in the range of 5 nM to 40 $\mu$M. More preferably, they are in the range of 5 nM to 5 $\mu$M. Cells may be attached at 10 to 1000 cells per spot depending upon their size. Similarly, optimal surface densities for attachment of other biomolecules may be easily determined by those skilled in the art through a routine experimentation.

In accordance with the present invention, it is preferable, subsequent to the attachment of biomolecules or cells to the coated substrates, to "block" the non-reacted pendant functional groups from further unwanted reactions. For the purpose of the present invention, the pendant functional groups contained in the solid support or polymeric coating may be blocked by any chemicals that can inactivate the remaining reactive groups. For example, unreacted acyl fluoride functionalities may be reacted with ammonium hydroxide to form carboxamide or with ethanol to form esters. Those skilled in the art will recognize, however, that a host of blocking reactions are possible.

As mentioned above, many applications for utilizing immobilized biomolecules and cells require that biomolecules and cells be immobilized at site-specific locations on a solid support surface. In order to prepare ordered arrays of biomolecules and cells, including grids and 1×n arrays of immobilized biomolecules or cells with each biomolecule or cell located at site-specific locations, a preselected site on the surface of the coated substrate is exposed to a solution of the desired biomolecules or cells. In accordance with the present invention, this can be accomplished manually by applying an amount of biomolecule or cell solution to a preselected location on the coated substrate. Alternatively, thermal inkjet printing techniques utilizing commercially available jet printers and piezoelectric microjet printing techniques, as described in U.S. Pat. No. 4,877,745, can be utilized to spot-selected coated substrate surface sites with selected biomolecules or cells.

Attachment of biomolecules and cells to coated substrates of the present invention is well suited for use in the construction of genosensors and other array-based systems, such as differential gene expression micro-arrays. Consequently, another aspect of the present invention provides a bioarray prepared by a method comprising the steps of:
  (a) providing a plurality of biomolecules or cells;
  (b) providing a solid support with a surface;
  (c) depositing by a chemical plasma-mediated polymerization process a polymeric coating on the surface to form a coated substrate, wherein the polymeric coating comprises at least one pendant functional group capable of attaching the biomolecule or the cell; and
  (d) contacting the biomolecules or the cells with discrete locations on the coated substrate under a condition that allows the binding of the biomolecules or the cells with the pendant functional groups contained in the discrete locations to form a bioarray.

A solid support with attached biomolecules of the present invention may be used as a device for performing a ligand-binding assay or for performing a hybridization assay by either reverse hybridization (probes attached) or southern blot (target attached). Such a device may also be used in an immunoassay. The method of the utilization of bioarrays in biomedical research are well known to those skilled in the art and will not be discussed herein.

The following examples are intended to illustrate, but not to limit, the scope of the invention. While such examples are typical of those that might be used, other procedures known to those skilled in the art may alternatively be utilized. Indeed, those of ordinary skill in the art can readily envision and produce further embodiments, based on the teachings herein, without undue experimentation.

EXAMPLES

Example 1

Depositing of Polymeric Coatings of Acrylic Acid or Vinyl Acetic Acid onto Polypropylene Sheet or Glass Slides by the RFPD-CVD Process:

Clean glass slides and/or polypropylene polymer sheets were placed in a plasma chamber. The materials were subjected to RFPD (radiofrequency plasma discharge) initiated oxygen plasma (~150 to ~180 mtorr $O_2$; ~450 to ~500 watts, RF power, 3 minutes), immediately followed by the introduction of acylic acid (or vinyl acidic acid) monomer aerosol delivered to the chamber under an argon atmosphere (~240 mtorr Ar; 500 watts, RF power, 3 minutes). The plasma polymerization process was quenched in an argon atmosphere (~165 mtorr Ar; 0 watts, RF power, 3 minutes). The coated materials were removed from the chamber and stored in sealed polyester bags.

The deposition of polymeric coatings of acrylic acid (AA) and vinyl acetic acid (VA) was repeated at various power levels in order to determine optimal conditions for the novel process of the present invention. For AA polymerization, the power levels were set as follows: process 1 (500 W), process 2 (250 W) and process 3 (300 W). For VA polymerization, the power levels were set as follows: process 4 (500 W), process 5 (250 W) and process 6 (300 W).

Example 2

Preparing Substrates for Biomolecule Immobilization by the RFPD/NH3 Method of Prior Art:

Polypropylene polymer sheets were placed in an RFPD plasma chamber. The chamber was evacuated and filled with anhydrous ammonia gas (~250 mtorr, $NH_3$, 4 minutes). RFPD was initiated for 2 minutes at 200 watts, RF power in an ammonia atmosphere (~300 mtorr). Power was turned-off and the substrates quenched under ammonia (~250 mtorr, 2 minutes), followed by argon (~265 mtorr) for 10 minutes. The surface-aminated materials were removed from the chamber and stored in sealed polyester bags.

Example 3

Comparison of Biomolecule-Binding Capacity of Coated Substrates of the Present Invention and Aminated Substrates of the Prior Art:

Polypropylene slides, microplates, and glass slides were coated by RFPD-CVD processes using acylic acid monomer or vinyl acetic acid monomer. Nucleic acids and proteins were successfully immobilized to these surfaces.

Virgin polypropylene sheets (20 mm) were surface-aminated by RFPD in an ammonia gas atmosphere, derivatized with succinic anhydride to form carboxyl groups and converted to the acyl fluoride form as described above (prior art method). Alternatively, virgin polypropylene sheets were subjected to RFPD-CVD process to prepare surface coatings of carboxylated polymers, which in turn were converted to the acyl fluoride form. To access the surface activity, each sheet was printed with an amino-biotin compound (BAPA) which became covalently attached via nucleophilic attack of the acyl fluoride:

Following incubation with streptavidin-alkaline phosphatase (AP) (pH 7.2, 25° C.; 0.5 hrs.), the sheets were compared for biotin-streptavidin binding using the enzyme-labeled fluorescence (ELF) signal development reagent (Molecular Probes, Inc., Eugene, Oreg.). Corresponding regions of fluorescent spots that were representative across all arrays were selected for statistical analysis. These two areas [bottom 2×4 sub-array; bottom right 1×7 sub-array] on each of the arrays were compared and means with standard deviations calculated. The RFPD-CVD coating processes appeared to significantly increase the surface-binding capacity relative to the RFPD/NH3 surface activation process.

While the foregoing has been described in considerable detail and in terms of preferred embodiments, these are not to be construed as limitations on the disclosure or claims to follow. Modifications and changes that are within the purview of those skilled in the art are intended to fall within the scope of the following claims.

What is claimed is:

1. A method of preparing a substrate for the arraying of biomolecules or cells comprising the steps of:
   (a) providing a solid support having a surface; and
   (b) depositing by a chemical plasma-mediated polymerization process a polymeric coating on the surface, wherein the polymeric coating comprises at least one pendant functional group capable of attaching the biomolecule or the cell, wherein the polymeric coating comprises a carboxylated polymer and wherein the step (b) comprises:
   (c) depositing by the chemical plasma-mediated polymerization process the carboxylated polymer coating on the surface, wherein the carboxylated polymeric coating contains at least one pendant carboxyl group; and
   (d) activating the carboxylated polymeric coating by converting the carboxyl group into a group capable of attaching a biomolecule or a cell.

2. The method of claim 1, wherein the depositing step (c) comprises:
   (e) introducing a carboxylated monomer and the solid support into a plasma chamber; and
   (f) forming the carboxylated polymeric coating on the solid support by providing a radiofrequency plasma discharge (RFPD) in the plasma chamber under conditions sufficient for free radical polymerization of the carboxylated monomer to form a carboxylated polymer and for further adsorption of the formed carboxylated polymer on the solid support.

3. The method of claim 2, wherein the carboxylated monomer is selected from a group consisting of an acrylic acid monomer, a vinyl acetic acid monomer, a carboxy-silane monomer, a carboxy-silanol monomer, a methacylate or acylate monomer, and mixtures thereof.

4. The method of claim 1, wherein the activating step comprises converting the carboxyl group into an acyl fluoride group.

5. The method of claim 4, wherein the activating step further comprises reacting the carboxylated polymeric coating with a reagent selected from the group consisting of (diethylaminosulphur)trifluoride (DAST), cyanuric fluoride, and tetramethylfluoroformadinium hexafluorophosphate.

6. The method of claim 2, further comprising a step of:
pretreating the surface of the solid support to enhance adsorption of the monomer or polymeric coating.

7. The method of claim 6, wherein the pretreating step comprises plasma etching or plasma-induced oxidation of the surface.

8. The method of claim 1, wherein the chemical plasma-mediated polymerization process is accomplished by plasma-induced grafting, comprising first treating the substrate in an argon-, helium- or other noble gas-plasma and then introducing a monomer or a polymer into the plasma chamber and allowing the monomer or polymer to react with the substrate.

9. The method of claim 1, wherein the chemical plasma-mediated polymerization process is selected from a group consisting of a chemical vapor deposition (CVD) process and plasma-induced grafting.

10. The method of claim 1, further comprising a step of:
selecting a material that provides the polymeric coating of step (b) a surface property that enhances binding between the pendant group and the biomolecule or the cell.

11. The method of claim 10, wherein the polymeric coating is hydrophobic, hydrophilic, zwitterionic, or a combination thereof.

12. The method of claim 10, wherein the biomolecule or an outer surface of the cell is hydrophobic, the selecting step comprises selecting a material that provides the polymeric coating of step (b) a hydrophobic property.

13. The method of claim 10, wherein the biomolecule or an outer surface of the cell is hydrophobic, the selecting step comprises selecting a material that provides the polymeric coating of step (b) a hydrophobic property.

14. The method of claim 10, wherein the biomolecule or an outer surface of the cell has both cationic and anionic functionalities, the selecting step comprises selecting a material that provides the polymeric coating of step (b) a zwitterionic property capable of ionic interaction with the biomolecule or the cell.

15. The method of claim 1, wherein the pendant functional group is selected from a group consisting of acyl fluorides, anhydrides, oxiranes, aldehydes, hydrazides, acyl azides, aryl azides, diazo compounds, benzophenones, carbodiimides, imidoesters, isothiocyanates, NHS esters, CNBr, maleimides, tosylates, tresyl chloride, maleic anhydrides, and carbonyldiimidazoles.

16. The method of claim 1, wherein the coating comprises at least two types of pendant functional groups, wherein a first type of functional groups is reactive toward a first biomolecule or a first cell and a second type of functional groups is reactive toward a second biomolecule or a second cell.

17. The method of claim 1, wherein the depositing step (c) comprises:
masking the solid support to form exposed and covered areas; and
depositing the polymeric coating on the exposed areas.

18. The method of claim 17, further comprising a step of pre-treating the exposed areas prior to the depositing step to produce surface functional groups using a reactive plasma.

19. The method of claim 18, further comprising a step of independently and site-specifically coating the pre-treated exposed areas with surface groups.

20. A method of attaching biomolecules and cells to a solid support comprising:
(a) providing a biomolecule or a cell;
(b) providing a solid support with a surface;
(c) depositing by a chemical plasma-mediated polymerization process a polymeric coating on the surface to form a coated substrate, wherein the polymeric coating comprises at least one pendant functional group capable of attaching the biomolecule or the cell; and
(d) contacting the biomolecule or the cell with the coated substrate under a condition that allows binding of the biomolecule or the cell with the pendant functional group, wherein the polymeric coating comprises a carboxylated polymer and wherein the step (c) comprises:
depositing by the chemical plasma-mediated polymerization process the carboxylated polymer coating on the surface, wherein the carboxylated polymeric coating contains at least one pendant carboxyl group; and
activating the carboxylated polymeric coating by converting the carboxyl group into a group capable of attaching a biomolecule or a cell.

21. The method of claim 20, wherein the biomolecule is selected from a group consisting of: nucleic acids, polynucleotides, polypeptides, proteins, carbohydrates, lipids, and analogs thereof.

22. The method of claim 21, wherein the biomolecule is a polynucleotide selected from a group consisting of amplified DNA, cDNA, single-stranded DNA, double-stranded DNA, PNA, RNA, and mRNA.

23. The method of claim 20, wherein a plurality of biomolecules or cells is provided and wherein the contacting step comprises contacting the biomolecules or cells with pendant functional groups at discrete locations on the coated substrate, whereby a bioarray is formed.

24. The method of claim 20, wherein the contacting step is carried out by a technique selected from a group consisting of jet printing, solid or open capillary device contact printing, microfluidic channel printing, silk screening, and a technique using printing devices based upon electrochemical or electromagnetic forces.

25. The method of claim 20, wherein the contacting step is carried out by spotting the biomolecules or cells to the solid support.

* * * * *

UNITED STATES PATENT AND TRADEMARK OFFICE
CERTIFICATE OF CORRECTION

PATENT NO. : 6,984,485 B2
DATED : January 10, 2006
INVENTOR(S) : Robert S. Matson It is certified that error appears in the above-identified patent and that said Letters Patent is hereby corrected as shown below:

Column 17,
Lines 42 and 44, change "hydrophobic" to -- hydrophilic --.

Signed and Sealed this

Twenty-fifth Day of April, 2006

JON W. DUDAS
*Director of the United States Patent and Trademark Office*